United States Patent
Zhang et al.

(10) Patent No.: US 10,202,889 B2
(45) Date of Patent: Feb. 12, 2019

(54) DEGAS BOTTLE HAVING CENTRIFUGAL AIR SEPARATOR FOR USE IN ENGINE COOLING SYSTEM

(71) Applicant: Ford Global Technologies, LLC, Dearborn, MI (US)

(72) Inventors: Yi Zhang, Ann Arbor, MI (US); Eric Myers, Howell, MI (US); Meisam Mehravaran, Oak Park, MI (US); Cristian Gheordunescu, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 915 days.

(21) Appl. No.: 14/600,785

(22) Filed: Jan. 20, 2015

(65) Prior Publication Data
US 2016/0208678 A1  Jul. 21, 2016

(51) Int. Cl.
*B01D 19/00* (2006.01)
*F01P 11/02* (2006.01)
*F16N 19/00* (2006.01)
*F16N 39/00* (2006.01)
(Continued)

(52) U.S. Cl.
CPC ........ *F01P 11/028* (2013.01); *B01D 19/0057* (2013.01); *F01P 11/0204* (2013.01); *F16N 19/00* (2013.01); *F16N 39/002* (2013.01); *F01M 2011/0095* (2013.01); *F01M 2013/0427* (2013.01)

(58) Field of Classification Search
None
See application file for complete search history.

(56) References Cited

U.S. PATENT DOCUMENTS 3,898,068 A * 8/1975 McNeil ................. B01D 45/12
55/337
4,075,984 A * 2/1978 Kirchgessner ......... F01P 11/028
123/41.54
(Continued)

FOREIGN PATENT DOCUMENTS

GB          2437064 A  * 10/2007 ......... B01D 19/0052

OTHER PUBLICATIONS

Armstrong Pumps, Vortex Air Separator, The Air Removal Requirement, Product Data Sheet, File 37.15, Dec. 18, 2007.

*Primary Examiner* — Amber R Orlando
*Assistant Examiner* — Phillip Y Shao
(74) *Attorney, Agent, or Firm* — LeClairRyan

(57) ABSTRACT

A degas bottle for inducing a cyclonic direction of flow to incoming coolant is disclosed. The degas bottle includes a body and an air separator having a cylindrical wall. An incoming coolant inlet is attached to the upper end of the air separator and is positioned at a tangent with respect to the cylindrical wall of the air separator, thus inducing cyclonic action as the coolant enters the air separator. The air separator may be of a cylindrical shape or of a conical shape. As air trapped coolant tangentially flows into the air separator, it will follow the cylindrical or conical shape of the air separator. The centrifugal force keeps the incoming coolant pressed against the inner wall of the air separator coolant on the wall while air separates from the coolant. The cyclonically flowing coolant circles downward to the reservoir while air remains on top of the coolant.

13 Claims, 2 Drawing Sheets

(51) Int. Cl.
*F01M 11/00* (2006.01)
*F01M 13/04* (2006.01)

(56) References Cited

U.S. PATENT DOCUMENTS

| | | | |
|---|---|---|---|
| 4,273,563 A * | 6/1981 | Fadda | F01P 11/029 |
| | | | 123/41.54 |
| 6,216,646 B1 | 4/2001 | Smith et al. | |
| 7,395,787 B1 | 7/2008 | Claypole et al. | |
| 2007/0163442 A1* | 7/2007 | Saito | B01D 19/0057 |
| | | | 96/209 |
| 2008/0179227 A1* | 7/2008 | Saito | B01D 19/0042 |
| | | | 210/109 |
| 2009/0020081 A1 | 1/2009 | Claypole et al. | |
| 2009/0120296 A1* | 5/2009 | Saito | B01D 19/0057 |
| | | | 96/174 |
| 2010/0206882 A1* | 8/2010 | Wessels | F01P 11/029 |
| | | | 220/562 |
| 2012/0090348 A1 | 4/2012 | O'Rourke et al. | |

\* cited by examiner

DEGAS BOTTLE HAVING CENTRIFUGAL AIR SEPARATOR FOR USE IN ENGINE COOLING SYSTEM

TECHNICAL FIELD

The disclosed inventive concept relates generally to cooling systems for internal combustion engines. More particularly, the disclosed inventive concept relates to a degas bottle having a centrifugal air separator for use in internal combustion engine cooling systems.

BACKGROUND OF THE INVENTION

The cooling system of most modern vehicles having internal combustion engines is a closed system. It is typical for a gas (such as air and/or coolant vapor) to be caught in the closed coolant system. However, the presence of gas trapped in the coolant reduces cooling system efficiency that may potentially lead to the failure of engine components including the turbo charger and the transmission and may even lead to engine failure itself.

Accordingly, an arrangement is required for aerating the cooling system to allow for the escape of trapped gas. Current de-aeration and degasing systems for internal combustion engine cooling systems incorporates a coolant bottle that has a degasing chamber. A portion of the coolant passes through the degasing chamber during engine operation. The movement of the coolant through the degasing chamber is continuous while the engine is on. As a result, gas is separated from the coolant and is accumulated. The coolant bottle, or degas bottle, also serves as an overflow reservoir for coolant as its temperature rises.

Current degas bottle design is based on the buoyancy effect to separate air from coolant. Air has lower density as compared to engine coolant, thus as the coolant with trapped air moves through a flow path, the air bubbles flow up to the top while the coolant remains below at the bottom of the degas bottle, forming the coolant reservoir. To achieve a good air-coolant separation, the flow path needs to be sufficiently long. However, due to the constraint of vehicle package space, degas bottle size is limited. To achieve a sufficiently long flow path, the degas bottle is internally divided into many small chambers connected by holes, making tooling cost expensive. As coolant flows through the holes, it can become turbulent at a high flow rate. If the turbulence is too severe, the coolant starts foaming and, as a consequence, air bubbles form.

In addition to having known inefficiencies, the degas bottle is in general on the low priority list when vehicle package space is divided and designated. As a result, the degas bottle has to fit into a narrowly defined space. Thus, from vehicle to vehicle, the degas bottle often has to be redesigned to fit within its designated space. As a consequence, the internal chamber and the flow path have to be changed as well, also vehicle to vehicle, resulting in increased design cost.

Accordingly, as in so many areas of vehicle technology, there is room for improvement related to the design of degas bottles used in the cooling system of the modern internal combustion engine.

SUMMARY OF THE INVENTION

The disclosed inventive concept overcomes the problems associated with known degas bottles by providing a centrifugal air separator attached to a coolant reservoir. The incoming coolant inlet is positioned at a tangent with respect to the cylindrical wall of the air separator, thus inducing cyclonic flow as the coolant enters the air separator. The air separator may be of a cylindrical shape or of a conical shape. As air trapped coolant tangentially flows into the air separator, it will follow the cylindrical or conical shape of the air separator. The centrifugal force keeps the incoming coolant pressed against the inner wall of the air separator while air separates from the coolant. The cyclonically flowing coolant circles downward to the reservoir while air migrates to the center of the cyclone The degas bottle particularly includes an upper portion to hold the volume of gas and a lower portion to hold a quantity of coolant. The air separator is positioned substantially within the degas bottle body. The separator has a circumferential wall. A coolant inlet is attached to the air separator at a tangent with respect to the circumferential wall.

The body of the degas bottle has an interior and the air separator has a vent hole open between the air separator and the interior of the body. The removable coolant fill cap may be fitted to the top of the air separator or to the top of the body.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
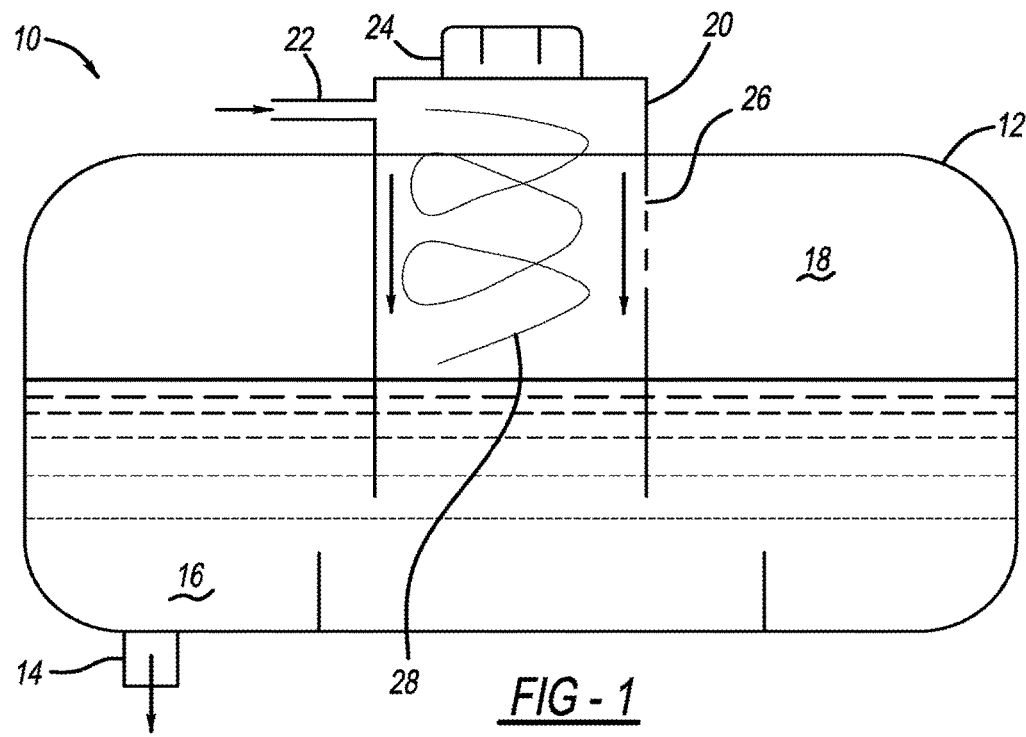
FIG. 1 is a sectional view of a degas bottle having a cylindrical air separator with a removable cap fitted thereover according to first embodiment of the disclosed inventive concept.

In the following figures, the same reference numerals will be used to refer to the same components. In the following description, various operating parameters and components are described for different constructed embodiments. These specific parameters and components are included as examples and are not meant to be limiting.

The degas bottle of the disclosed inventive concept is illustrated in its various embodiments in FIGS. 1 through 4. However, it is to be understood that the illustrated embodiments are suggestive and are not intended as being limiting, as other shapes of the degas bottle may be adopted as necessary to conform to the designated package space without deviating from the disclosed inventive concept.

Referring to FIG. 1, a degas bottle, generally illustrated as 10, is shown. The degas bottle 10 includes a body 12 having an outlet 14. The illustrated shape of the body 12 of the degas bottle 10 may be varied from that shown.

The body 12 of the degas bottle 10 provides interior space for a quantity of coolant 16 and a volume of air 18. The levels of the coolant 16 and air 18 as illustrated are intended as being suggestive and not limiting.

An air separator 20 is provided substantially within the body 12 of the degas bottle 10 with a portion of the air separator 20 extending from the top side of the body 12. The air separator 20 is preferably a separate item that can be assembled to the body 12, thus allowing the air separator 20 to be a standard component that may be adapted to a wide variety of cooling system tanks, thus reducing the cost of the air separator 20 and the degas bottle 10. A tangential coolant inlet 22 extends from the top portion of the air separator 20. A removable coolant fill cap 24 is attached to a threaded neck (not shown) that extends upward from the air separator 20 in a conventional manner.

The air separator 20 has a cylindrical shape that is generally constant in diameter from top to bottom. One or more small vent holes 26 are formed on the side of the air separator 20 in an area adjacent to the volume of air 18 restrained within the body 12 to allow the passage of air.

Coolant that enters air separator 20 through the tangential coolant inlet 22 circulates around the interior of the air separator 20 before coming into contact with the coolant 16 pooled at the lower portion of the body 12. The path of this flow is cyclonic and generally follows the path defined by the cyclonic action 28. As a result of the centrifugal force created by the cyclonic action 28, the coolant is directed to and against the inner wall of the air separator 20 and becomes separated from any air being carried into the air separator 20 as the coolant enters the degas bottle 10 through the tangential coolant inlet 22. Moved by gravity, the flowing coolant circles downward and enters the lower portion of the body 12. The separated air remains on top and eventually passes out of the air separator 20 through the small vent holes 26 to join the volume of air 18 held within the body 12.

Figure 2:
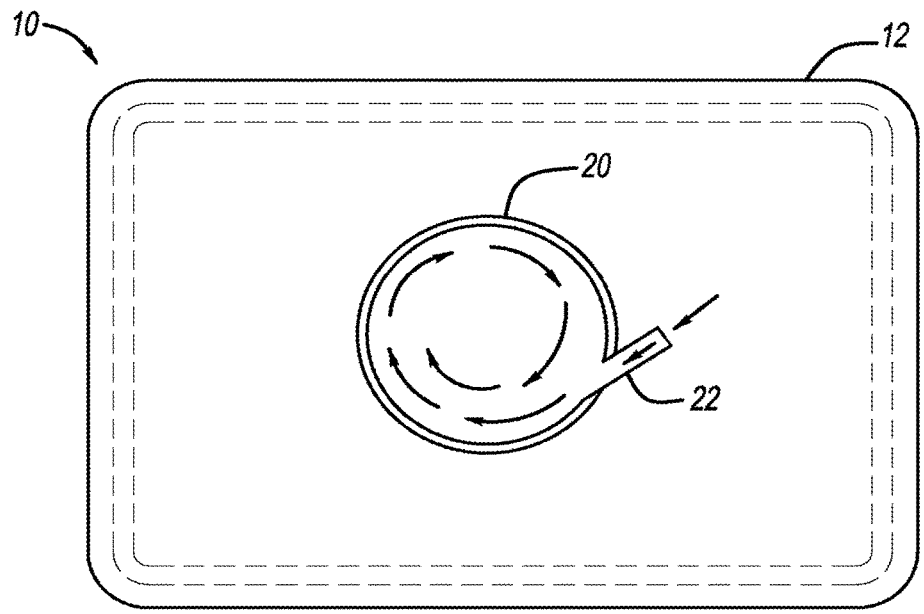
FIG. 2 is a top view of the degas bottle of FIG. 1 with the upper portion of the air separator removed to illustrate the direction of flow of the incoming coolant created by the tangential coolant inlet.

FIG. 2 is a view of the degas tank 10 as seen from the top. An upper portion of the air separator 20 has been removed to show the tangential coolant inlet 22 and the cyclical direction of flow of the incoming coolant. As illustrated, the tangential coolant inlet line 22 is disposed at a tangent to the circumferential wall of the air separator 20.

Figure 3:
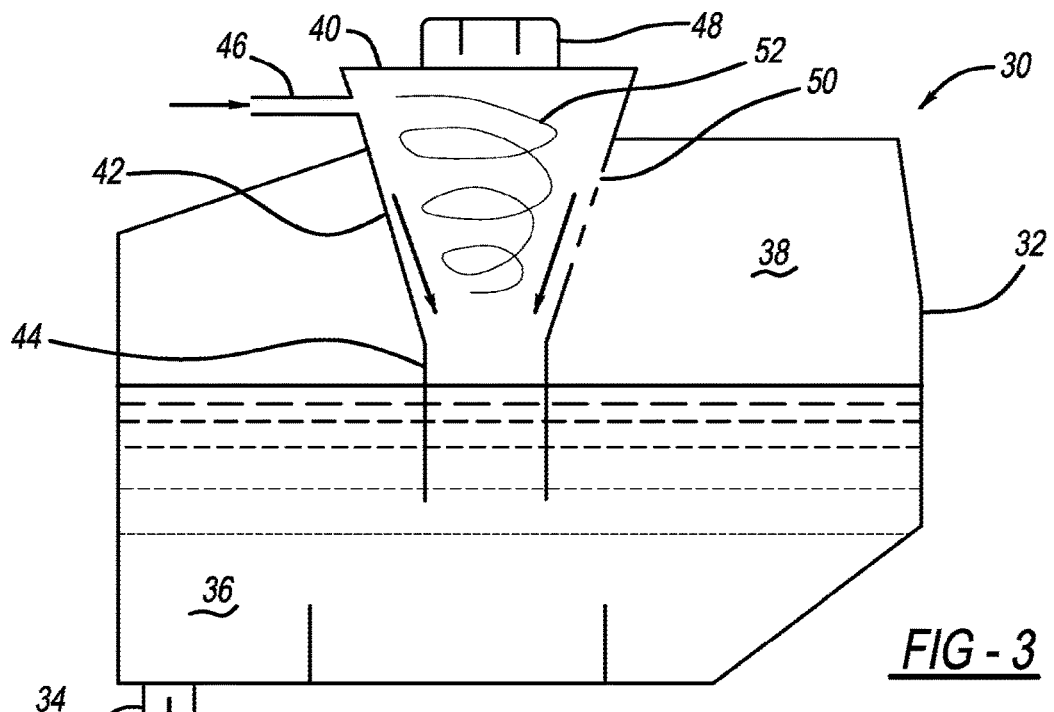
FIG. 3 is a sectional view of a degas bottle having a conical air separator with a removable cap fitted thereover according to a second embodiment of the disclosed inventive concept.

While FIG. 1 illustrates a degas bottle having a cylindrically-shaped air separator, other designs may be advantageously adopted. One such design is illustrated in FIG. 3. According to this embodiment, a degas bottle, generally illustrated as 30, is shown. The degas bottle 30 includes a body 32 having an outlet 34.

The body 32 of the degas bottle 30 provides interior space for a quantity of coolant 36 and a volume of air 38. The levels of the coolant 36 and air 38 as illustrated are intended as being suggestive and not limiting.

An air separator 40 is provided substantially within the body 32 of the degas bottle 30 with a portion of the air separator 40 extending from the top side of the body 32. The air separator 40 has two portions, an upper portion 42 and a lower portion 44. The upper portion 42 of the air separator has a conical shape that narrows from top to bottom while the lower portion 44 has a cylindrical shape.

A tangential coolant inlet 46 extends from the top portion of the air separator 40. A removable coolant fill cap 48 is attached to a threaded neck (not shown) that extends upward from the air separator 40 in a conventional manner.

One or more small vent holes 50 are formed on the side of the air upper portion 42 of the air separator 40 in an area adjacent to the volume of air 38 restrained within the body 32 to allow the passage of air.

As is the case for the embodiment of the disclosed inventive concept illustrated in FIGS. 1 and 2 and as discussed in relation thereto, coolant entering the air separator 40 through the tangential coolant inlet 46 circulates around the interior of the conically-shaped upper portion 42 of the air separator 40 before passing into and through the cylindrically-shaped lower portion 44 and into quantity of coolant 36 pooled at the lower portion of the body 32. The path of this flow is cyclonic and generally follows the path defined by the cyclonic action 52. As a result of the centrifugal force created by the cyclonic action 52, the coolant is directed to and against the inner wall of the upper portion 42 of the air separator 40 and becomes separated from any air being carried into the air separator 40 as the coolant enters the degas bottle 30 through the tangential coolant inlet 46. Moved by gravity, the flowing coolant circles downward and enters the lower portion of the body 32. The separated air remains on top and eventually passes out of the air separator 40 through the small vent holes 50 to join the volume of air 38 held within the body 32. The conical shape increases the centrifugal force as the coolant flows downwards.

Figure 4:
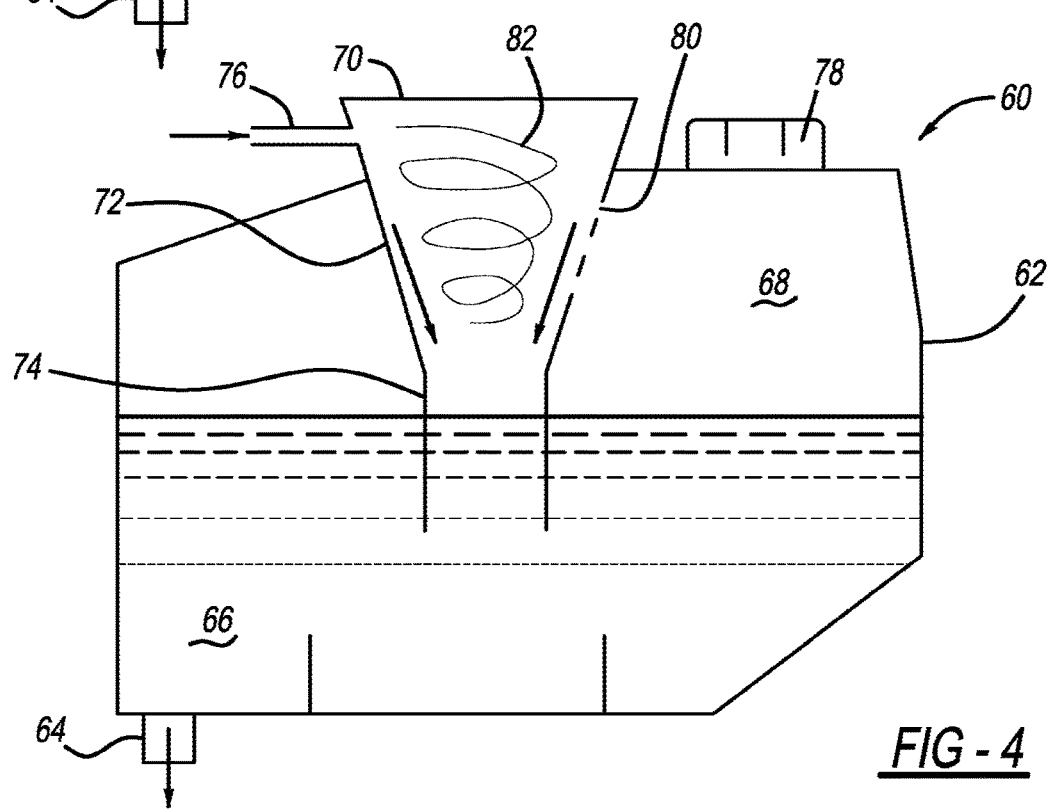
FIG. 4 is a sectional view of a degas bottle having a conical air separator with a removable cap fitted over the associated tank according to a third embodiment of the disclosed inventive concept.

A variation of the degas bottle of FIG. 3 is illustrated in FIG. 4 in which a degas bottle, generally illustrated as 60, is shown. The degas bottle 60 includes a body 62 having an outlet 64.

The body 62 of the degas bottle 60 provides interior space for a quantity of coolant 66 and a volume of air 68. The levels of the coolant 66 and air 68 as illustrated are intended as being suggestive and not limiting.

An air separator 70 is provided substantially within the body 62 of the degas bottle 60 with a portion of the air separator 70 extending from the top side of the body 62. The air separator 70 has two portions, an upper portion 72 and a lower portion 74. The upper portion 72 of the air separator has a conical shape that narrows from top to bottom while the lower portion 74 has a cylindrical shape.

A tangential coolant inlet 76 extends from the top portion of the air separator 70. A removable coolant fill cap 78 is attached to a threaded neck (not shown) that extends upward from the body 62 and is separated from the air separator 70 in a conventional manner.

One or more small vent holes 80 are formed on the side of the air upper portion 72 of the air separator 70 in an area adjacent to the volume of air 68 restrained within the body 62 to allow the passage of air.

As is the case for the embodiment of the disclosed inventive concept illustrated in FIG. 2 and discussed in relation thereto, coolant entering the air separator 70 through the tangential coolant inlet 76 circulates around the interior of the conically-shaped upper portion 72 of the air separator 70 before passing into and through the cylindrically-shaped lower portion 74 and into quantity of coolant 66 pooled at the lower portion of the body 62. Again, and as discussed above with respect to the embodiment shown in FIG. 3, the path of this flow is cyclonic and generally follows the path defined by the cyclonic action 82. As a result of the centrifugal force created by the cyclonic action 82, the coolant is directed to and against the inner wall of the upper portion 72 of the air separator 70 and becomes separated from any air being carried into the air separator 70 as the coolant enters the degas bottle 60 through the tangential coolant inlet 76. The flowing coolant circles downward and enters the lower portion of the body 62. The separated air remains on top and eventually passes out of the air separator 70 through the small vent holes 80 to join the volume of air 68 held within the body 62.

The degas bottle design of the disclosed inventive concept in its various embodiment overcomes the problems of known systems by providing an effective and practical method of separating air from coolant. The designs of the air separator discussed above and illustrated in the accompanying figures can be standardized and cataloged. The reservoir maintains its design flexibility to conform to the designated package space and does not need internal chambers and connecting holes to form the flow path. As a result, the reservoir tooling is much simpler, and thus less expensive to configure and manufacture than known designs. In addition, a low-cost manufacturing method such as blow molding may be used to produce the reservoir, thus reducing the overall cost of the degas bottle.

The centrifugal force used to separate air from the coolant in the degas bottle design of the disclosed inventive concept demonstrates greater effectiveness than known systems that rely on buoyancy. Accordingly, the degas bottle of the disclosed inventive concept may be more compact. Furthermore, the air separation based on centrifugal force incorporated into the degas bottle of the disclosed inventive concept has a higher flow rate threshold of foaming than known systems, and improving separation efficiency of the trapped air from the coolant.

While the preferred embodiments of the disclosed inventive concept have been discussed are shown in the accompanying drawings and are set forth in the associated description, one skilled in the art will readily recognize from such discussion, and from the accompanying drawings and claims that various changes, modifications and variations can be made therein without departing from the true spirit and fair scope of the invention as defined by the following claims.

What is claimed is:

1. A degas bottle for use with an internal combustion engine comprising:
    a body having an upper portion for containing a volume of gas and a lower portion for containing a quantity of coolant;
    an air separator attached to and positioned substantially within said body, said air separator having an upper surface, a conical upper portion extending from said upper surface and including a circumferential wall, and a vent hole formed in said circumferential wall of said conical upper portion; and
    a coolant inlet attached directly to said air separator and positioned on said air separator at a tangent with respect to said circumferential wall.

2. The degas bottle of claim 1 further including an outlet attached to said lower portion of said body.

3. The degas bottle of claim 1, wherein said air separator has a lower cylindrical portion.

4. The degas bottle of claim 1, wherein said air separator has a top and wherein said degas bottle further includes a fill cap removably positioned on said top of said degas bottle.

5. The degas bottle of claim 1, wherein said body has a top and wherein said degas bottle further includes a fill cap removably positioned on said top of said body.

6. A degas bottle for use with an internal combustion engine comprising:
    a body having an upper portion to contain a gas and a lower portion to contain a coolant;
    an air separator attached to and positioned substantially within said body, said air separator having an upper surface, a conical upper portion extending from said upper surface and including a circumferential wall; and
    a coolant inlet attached directly to said conical upper portion of said air separator and positioned on said air separator at a tangent with respect to said circumferential wall.

7. The degas bottle of claim 6 wherein said air separator has a lower portion.

8. The degas bottle of claim 7, wherein said lower portion is cylindrical.

9. The degas bottle of claim 6 wherein said body has an interior and wherein said air separator has a vent hole formed in said circumferential wall of said conical upper portion.

10. The degas bottle of claim 6, wherein said air separator has a top and wherein said degas bottle further includes a fill cap removably positioned on said top of said degas bottle.

11. The degas bottle of claim 6, wherein said body has a top and wherein said degas bottle further includes a fill cap removably positioned on said top of said body.

12. A degas bottle for use with an internal combustion engine comprising:
    a body having an upper portion to contain a gas and a lower portion to contain a coolant;
    an air separator attached to said body, said air separator having an upper surface, a conical upper portion extending from said upper surface and including a circumferential wall, and a vent hole formed in said circumferential wall of said conical upper portion; and
    a coolant inlet tangentially attached directly to said air separator and oriented to form a cyclonic flow of incoming coolant within said air separator, said incoming coolant immediately contacting said conical upper portion upon entering said air separator,
    wherein said gas and said coolant enter said conical upper portion of said air separator prior to entering said body.

13. The degas bottle of claim 12, wherein said air separator has a lower cylindrical portion.

* * * * *